US012267659B2

(12) United States Patent
Kim et al.

(10) Patent No.: US 12,267,659 B2
(45) Date of Patent: Apr. 1, 2025

(54) WATERPROOF MICROSPEAKER

(71) Applicant: EM-TECH Co., Ltd., Gyeongsangnam-do (KR)

(72) Inventors: Gang Tae Kim, Gyeongsangnam-do (KR); Heung Woo Jeong, Gyeongsangnam-do (KR); Hyun Woo Jeong, Busan (KR); Hyeon Sik You, Gyeongsangnam-do (KR)

(73) Assignee: EM-TECH Co., Ltd., Gyeongsangnam-do (KR)

( * ) Notice: Subject to any disclaimer, the term of this patent is extended or adjusted under 35 U.S.C. 154(b) by 174 days.

(21) Appl. No.: 18/136,962

(22) Filed: Apr. 20, 2023

(65) Prior Publication Data

US 2023/0353944 A1 Nov. 2, 2023

(30) Foreign Application Priority Data

Apr. 27, 2022 (KR) .......................... 1020220051989

(51) Int. Cl.

| | |
|---|---|
| ***H04R 9/02*** | (2006.01) |
| ***H04R 1/02*** | (2006.01) |
| ***H04R 5/04*** | (2006.01) |
| ***H04R 7/12*** | (2006.01) |
| ***H04R 13/00*** | (2006.01) |

(52) U.S. Cl.

CPC ............. *H04R 9/025* (2013.01); *H04R 1/021* (2013.01); *H04R 5/04* (2013.01); *H04R 7/127* (2013.01); *H04R 13/00* (2013.01)

(58) Field of Classification Search

CPC .......... H04R 9/025; H04R 1/021; H04R 5/04; H04R 7/127; H04R 13/00; H04R 7/18; H04R 2499/11; H04R 9/06; H04R 1/44; H04R 2307/025; H04R 2307/027

See application file for complete search history.

(56) References Cited

U.S. PATENT DOCUMENTS

| | | | | |
|---|---|---|---|---|
| 2012/0237076 | A1 | 9/2012 | Kuze | |
| 2020/0045427 | A1 * | 2/2020 | Chen | H04R 9/06 |
| 2022/0210574 | A1 * | 6/2022 | Kim | H04R 7/04 |

FOREIGN PATENT DOCUMENTS

| | | |
|---|---|---|
| KR | 101502269 B1 | 3/2015 |
| KR | 101889315 B1 | 8/2018 |
| KR | 102214649 B1 | 2/2021 |

* cited by examiner

*Primary Examiner* — Tuan D Nguyen

(74) *Attorney, Agent, or Firm* — Murphy, Bilak & Homiller, PLLC

(57) ABSTRACT

A waterproof microspeaker includes: a frame; a magnetic circuit provided below the frame and including a yoke, inner and outer magnets, and a top plate; a voice coil located between the magnets and configured to vibrate by a magnetic field of the magnetic circuit and mutual electromagnetic force when an electric signal is applied; and a diaphragm housing provided above the frame. The diaphragm housing includes: a sidewall portion provided above the frame and having a predetermined height; an edge dome portion protruding upwardly or downwardly along an inner circumference of the sidewall portion; and a diaphragm provided inside the edge dome, allowing an upper end of the voice coil to be fixed thereto, and configured to generate sound by vibration of the voice coil. The diaphragm includes a polymeric material including metal or plastic and is inserted into an inner circumferential portion of the edge dome portion.

11 Claims, 14 Drawing Sheets

WATERPROOF MICROSPEAKER

TECHNICAL FIELD

The present disclosure relates to a waterproof microspeaker capable of improving a waterproof function as well as having a small thickness.

BACKGROUND

Mobile devices are equipped with a microspeaker to play a notification sound or content sound for users. In order to maximize the convenience of mobile devices, mobile devices equipped with a water-resistance function have increased, and accordingly, a microspeaker installed in the mobile devices needs to have a waterproof function.

FIG. 1 is a view illustrating a waterproof microspeaker according to the related art.

In a waterproof microspeaker disclosed in Korean Patent Registration No. 1889315, a diaphragm body includes a rigid top portion 11, a silicone rubber membrane 12, and a plastic support 13 coupled to an edge of the silicone rubber membrane 12. The silicone rubber membrane 12 includes a flat coupling portion 12*a* located at the center, a connection portion 12*b* located at the edge and injection-coupled with the plastic support 13, and a vent ring portion 12*c* located between the coupling portion 12*a* and the connection portion 12*b*. A protrusion or the vent ring portion 12*c*, which is inwardly recessed, is provided at an outer position of the top portion 11 on the silicone rubber membrane 12. An interval between an outer edge of the top portion 11 and an inner edge of the vent ring portion 12*c* may be in a numeral value range of 0.02 mm to 0.2 mm, and an adhesive is applied in a gap between the top portion 11 and the vent ring portion 12*c*.

According to the related art, since the top portion formed of a plastic material is configured to have a predetermined thickness in consideration of strength and injection moldability, it may be difficult to make the waterproof microspeaker thin.

In addition, since the top portion is bonded to the vent ring portion by a bond, waterproof performance may be affected by an application amount of a bond, an application position, and a pressure during bonding.

SUMMARY

Embodiments are aimed at solving the foregoing and other problems.

Another aspect of the embodiments is to provide a waterproof microspeaker having an improved waterproof function, while having a reduced thickness.

In an aspect, a waterproof microspeaker includes: a frame; a magnetic circuit provided below the frame and including a yoke, an inner magnet, an outer magnet, and a top plate; a voice coil located between the inner magnet and the outer magnet and vibrated by a magnetic field of the magnetic circuit and mutual electromagnetic force when an electric signal is applied; and a diaphragm housing provided above the frame, wherein the diaphragm housing includes: a sidewall portion provided above the frame and having a predetermined height; an edge dome portion protruding upwardly or downwardly along an inner circumference of the sidewall portion; and a diaphragm provided inside the edge dome, allowing an upper end of the voice coil to be fixed thereto, and generating sound by vibration of the voice coil, wherein the diaphragm includes a polymeric material including metal or plastic.

The sidewall portion may be formed of plastic material.

The diaphragm housing may further include a waterproof ring portion connected to the edge dome portion and protruding from an upper end of the sidewall portion.

The edge dome portion and the waterproof ring portion may be integrally formed of silicon rubber.

The voice coil may be configured to have a copper content of 15 to 100%.

The frame and the edge dome portion may be configured such that portions of surfaces thereof facing in a vertical direction have the same shape.

The top plate and the diaphragm may be configured such that portions of surfaces facing in a vertical direction have the same shape.

The diaphragm may include: an edge portion inserted into the edge dome portion; and a center portion protruding to be stepped upwardly or downwardly inside the edge portion.

The edge portion may have an upwardly or downwardly concavo-convex shape in the whole or part of the portion inserted into the edge dome portion.

The edge portion may have an upwardly or downwardly pocket-like shape in the whole or part of the portion inserted into the edge dome portion.

The edge portion may have an upwardly or downwardly protruding shape in the whole or part of the portion inserted into the edge dome portion.

According to embodiments, since the diaphragm housing is configured such that the diaphragm, which is a thin plate formed of a polymeric material, is inserted into the edge dome portion, the size of the magnet may increase, while an installation space of the diaphragm decreases, and since the weight of the voice coil coupled to the diaphragm may increase, while the weight of the diaphragm decreases, the performance of the microspeaker may be improved.

In addition, since the whole or portion of the center portion of the diaphragm protrudes to be stepped upwardly or downwardly, strength may be reinforced to increase rigidity and deformation may decrease even under high water pressure.

In addition, since the whole or portion of the edge portion of the diaphragm protrudes to be stepped upwardly or downwardly, a contact area and bonding force between the edge dome portion and the diaphragm may increase and a waterproof function between the edge dome portion and the diaphragm may be further enhanced under high water pressure.

DETAILED DESCRIPTION

Hereinafter, embodiments are described in detail with reference to the accompanying drawings.

Figure 1:
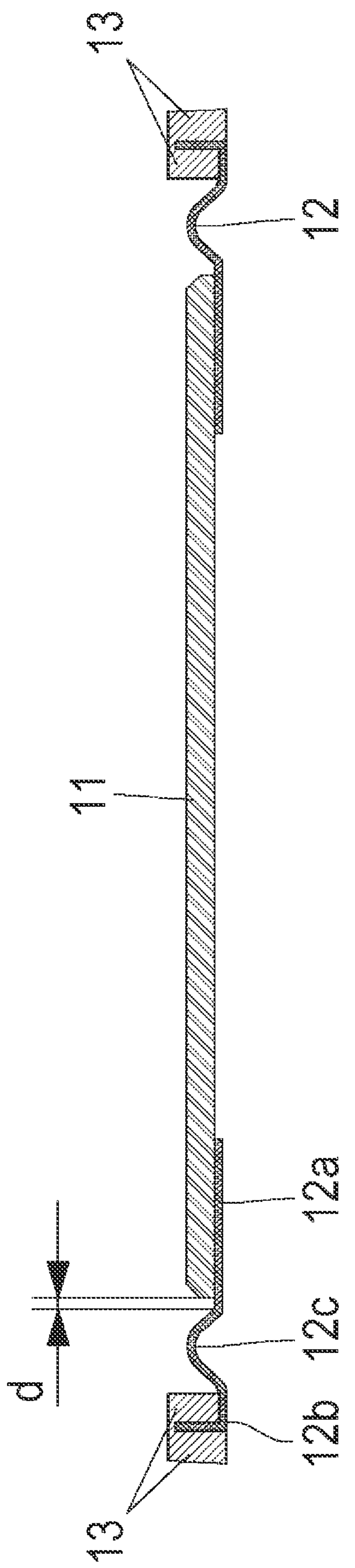
FIG. 1 is a view illustrating a portion of a waterproof microspeaker according to the related art.
Figure 2:
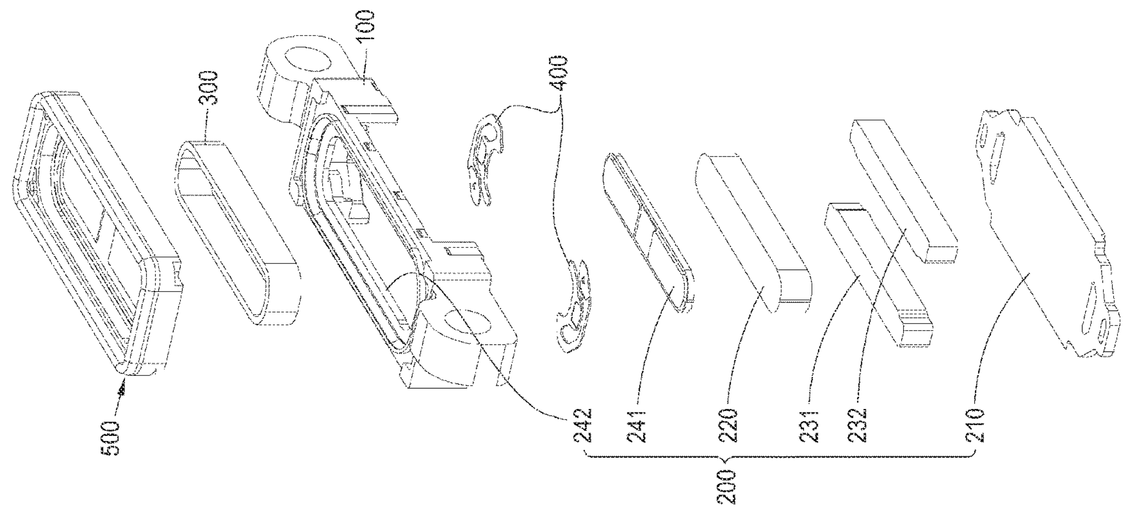
FIG. 2 is an exploded perspective view illustrating a waterproof microspeaker according to an embodiment.
Figure 3:
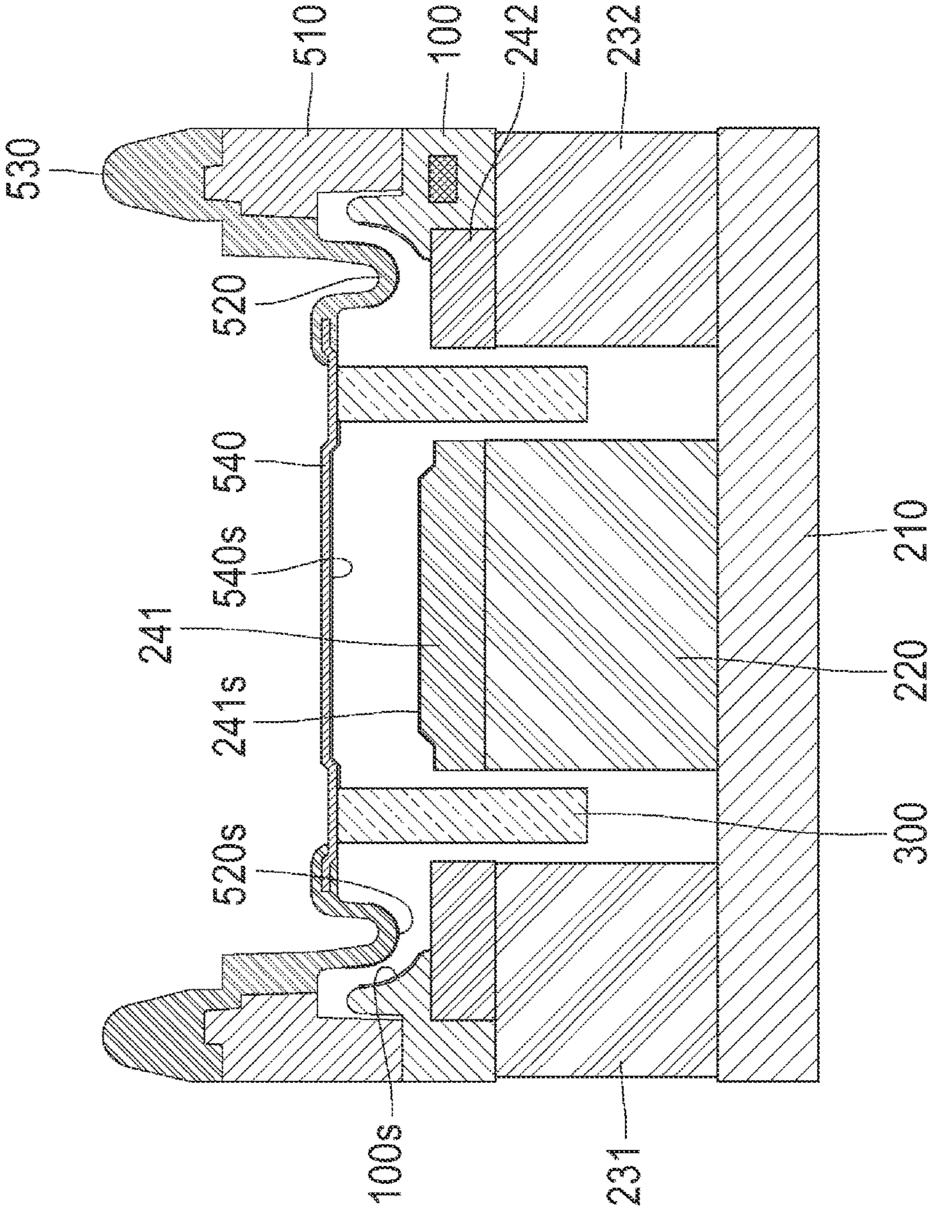
FIG. 3 is a side cross-sectional view illustrating a waterproof microspeaker according to an embodiment.
Figure 4:
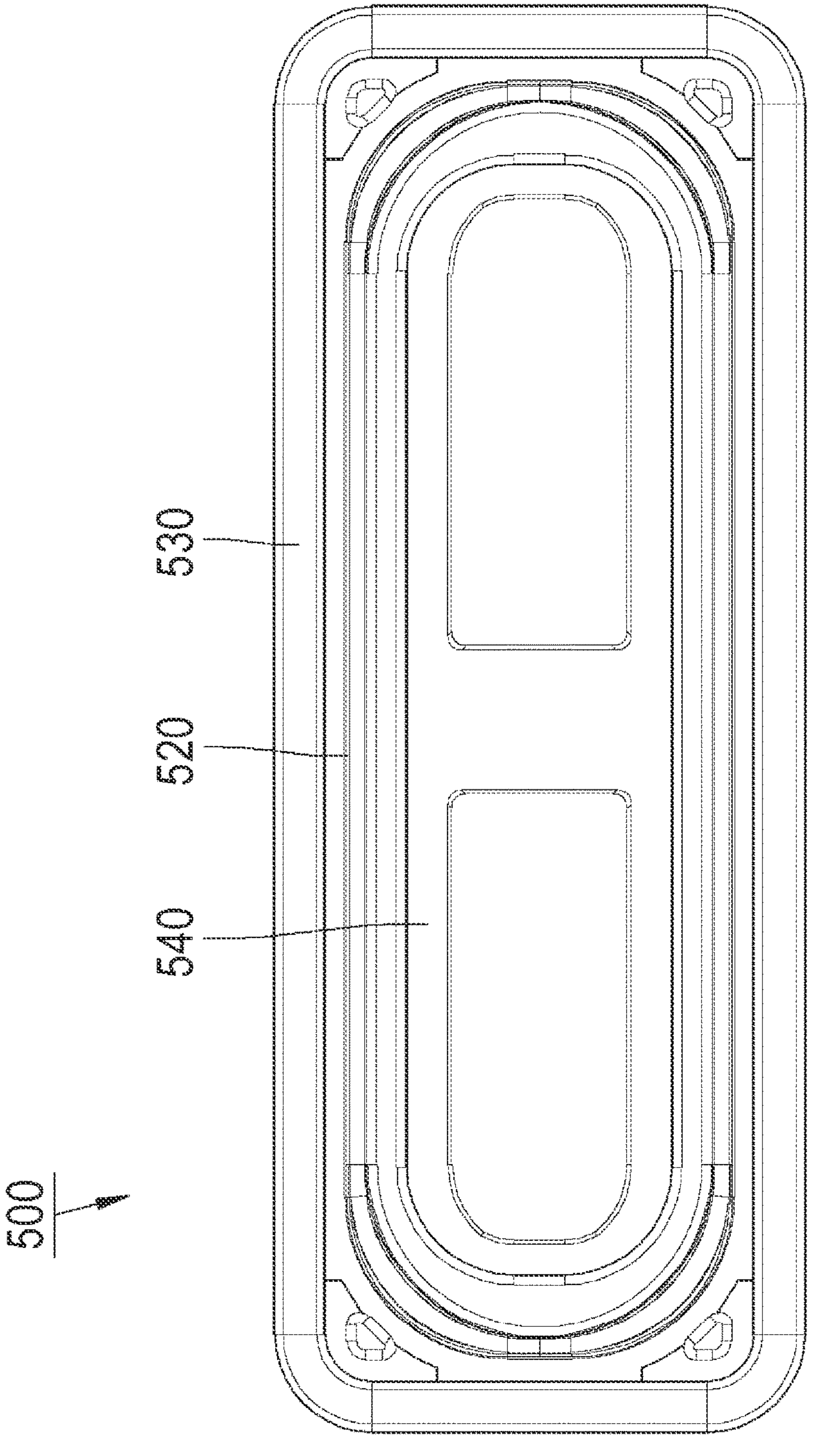
FIG. 4 is a plan view illustrating a diaphragm housing according to an embodiment.
Figure 5:
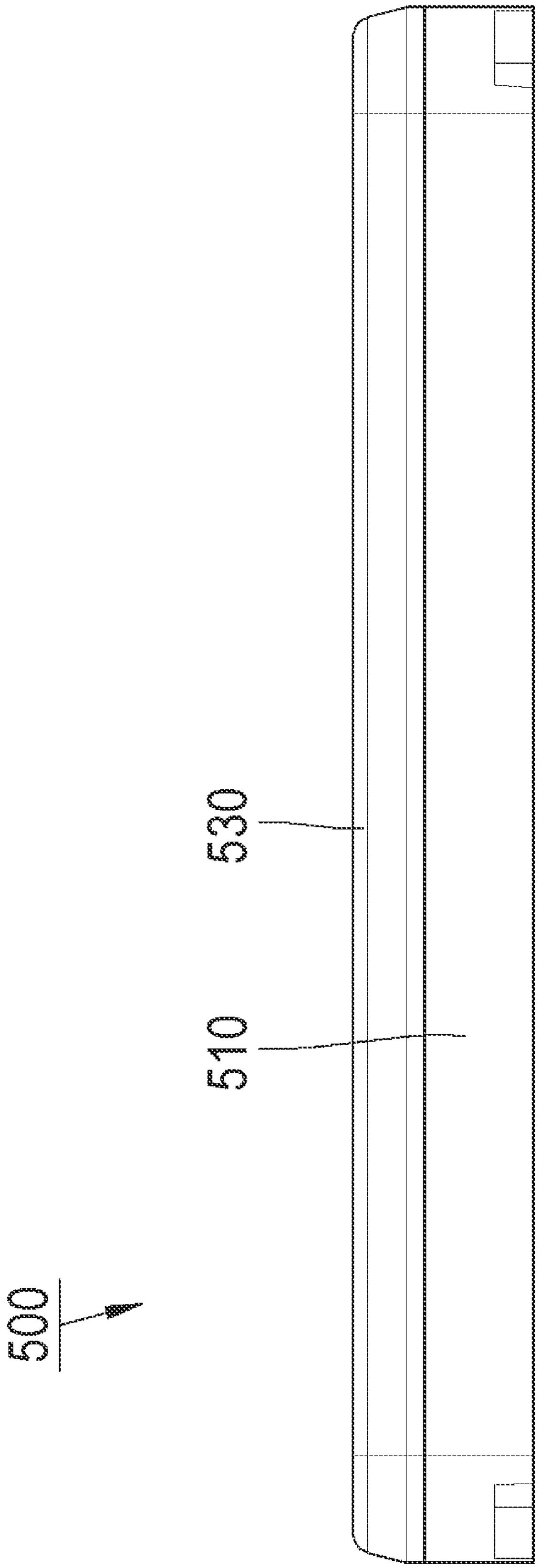
FIG. 5 is a side view illustrating a diaphragm housing according to an embodiment.
Figure 6:
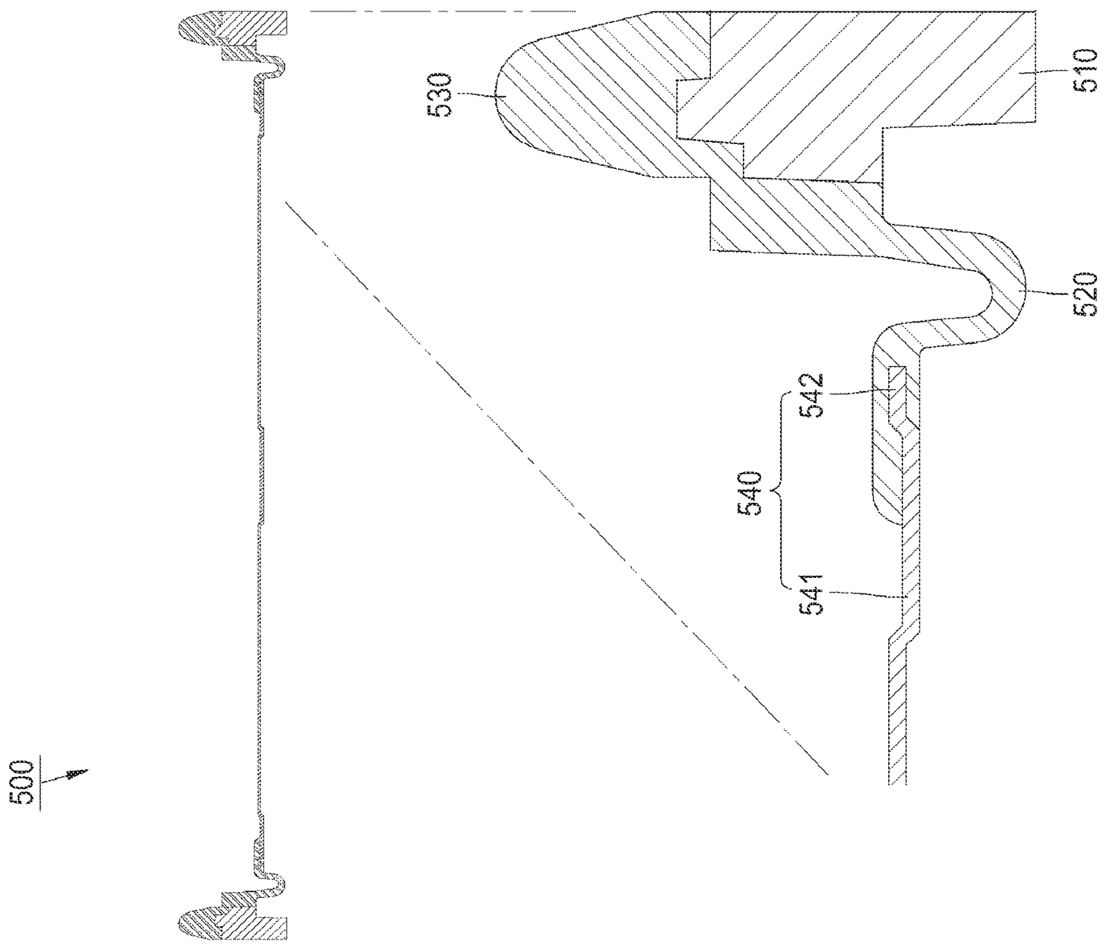
FIG. 6 is a side cross-sectional view of a diaphragm housing according to an embodiment.

FIGS. 2 and 3 are an exploded perspective and a side cross-sectional view, respectively, of a waterproof microspeaker according to an embodiment, and FIGS. 4 to 6 are a plan view, a side view, and a side cross-sectional view, respectively, of a diaphragm housing according to an embodiment.

The waterproof microspeaker of an embodiment includes a frame 100, a magnetic circuit 200 mounted inside the frame 100, a magnetic circuit 200 provided on a lower side of the frame 100, a voice coil 300 vibrated by mutual electromagnetic force with the magnetic circuit 200, a suspension 400 buffering and supporting the voice coil 300, and a diaphragm housing 500 coupled to the frame 100 and the voice coil 300 and vibrated together with the voice coil 300 to generate sound.

The frame 100 is in the form of a plastic injection-molded product and may be configured to have a rectangular ring shape having a pair of longer sides and a pair of shorter sides as a whole. An outer top plate 242 having a square ring shape included in the magnetic circuit 200 to be described below may be bonded or insert-injected to an inner circumferential surface of the frame 100. A lower portion of the shorter side of the frame 100 may be coupled to an upper surface of a yoke 210 to be described below.

The magnetic circuit 200 may include the yoke 210 having a plate-like shape, an inner magnet 220 attached to the upper surface of the yoke 210, a pair of outer magnets 231 and 232 disposed at a predetermined interval from the inner magnet 220, an inner top plate 241 attached to ab upper surface of the inner magnet 220, and the square ring-shaped outer top plate 242 attached to upper surfaces of the outer magnets 231 and 232.

The yoke 210 may be configured as a rectangular plate having a pair of longer skies and a pair of shorter sides. The inner magnet 220 and the outer magnets 231 and 232 are formed to extend along the longer side of the yoke. The inner magnet 220 is disposed to extend along a center portion of the longer side of the yoke 210 and is not exposed to the outside of the frame 100. The outer magnets 231 and 232 may be disposed on the edge portion of the longer side of the yoke 210 to maintain an air gap with the inner magnet 220, and may have a side exposed to the outside like the frame 100. When the inner top plate 241 is coupled to an upper surface of the inner magnet 220 and a lower portion of the shorter side of the frame 100 is coupled to an upper portion of the shorter side of the yoke 210, the outer top plate 242 may be coupled to the upper surfaces of the outer magnets 231 and 232.

The voice coil 300 is a coil member with a wire wound therearound. A lower end of the voice coil 300 may be disposed in the air gap between the inner magnet 220 and the outer magnets 231 and 232, and an upper end of the voice coil 300 may be fixed to the diaphragm housing. When external power is applied to the voice coil 300, the voice coil 300 may be in a movable state, and thus, the voice coil 300 may be vibrated in a vertical direction by mutual electromagnetic force between the magnetic circuit 200 and the voice coil 300.

The suspension 400 may be configured as a pair of plate springs to buffer and support the voice coil 300 in the frame 100, and may be provided to support a lower portion of the shorter side of the voice coil 3000 not to be interfered with the outer magnets 231 and 232, but the present disclosure is not limited thereto.

The diaphragm housing 500 may be provided above the frame 100 and the voice coil 300, vibrate together with the voice coil 300 to generate sound, and prevent water from entering the inside even under high water pressure.

In detail, the diaphragm housing 500 may include a sidewall portion 510 having a predetermined height, an edge dome portion 520 protruding upwardly or downwardly along an inner circumference of the sidewall portion 510, and a waterproof ring portion 530 provided upwardly above the edge dome portion 520, and a diaphragm 540 provided on an inner circumference of the edge dome portion 520.

The sidewall portion 510 may have a rectangular ring shape having a predetermined height and may be formed of a plastic material through injection molding. The sidewall portion 510 may be mounted on an upper side of the outer circumferential portion of the frame 100, and the sidewall portion, the frame 100, and the outer magnets 231 and 232 may constitute a side surface exposed to the outside.

The edge dome portion 520 may be provided to buffer and support the diaphragm 540 on the sidewall portion 510 and may be formed to be curved upwardly or downwardly on an inner circumference of the sidewall portion 510.

The waterproof ring portion 530 may be formed to protrude from the top of the sidewall portion 510 in order to increase waterproof performance. The edge dome portion 520 and the waterproof ring portion 530 may be integrally formed, and may be formed of silicon rubber having a predetermined elasticity. The edge dome portion 520 and the waterproof ring portion 530 may include a structure combined in inner circumferential surface and upper portion of the sidewall portion 510. Since the sidewall portion 510, the edge dome portion 520, and the waterproof ring portion 530 are formed of different materials, they may be double-injection-molded, but are not limited thereto.

The diaphragm 540 may be configured as a thin plate formed of a polymeric material including metal or plastic and may include a center portion 541 on which the voice coil 300 is mounted and an edge portion 542 inserted into the inner circumferential portion of the edge dome portion 520. Since an upper end of the voice coil 300 is attached to a lower surface of the center portion 541, sound may be generated as the diaphragm 540 vibrates together with the voice coil 300. Since the edge portion 542 is inserted into the edge dome portion 520, even when the diaphragm 540 vibrates, the edge portion 542 may be buffered and supported on the sidewall portion 510 by the edge dome portion 520.

In this manner, when the diaphragm 540 is inserted into the edge dome portion 520 in the form of a thin plate of a polymeric material, an installation space of the diaphragm 540 may be reduced, while the size of the magnet may be increased. In addition, while the weight of the diaphragm 540 decreases, the weight of the voice coil 300 combined with the diaphragm 540 may increase, and since the voice coil may have a copper content of 15 to 100% with higher conductivity, the performance of the microspeaker may be improved.

Meanwhile, in order to prevent the diaphragm 540 from being deformed even if the diaphragm 540 sags under high water pressure, portions that come into contact with each other due to the sagging of the diaphragm 540 may be configured to have the same shape to support each other. A lower surface 520*s* of the edge dome portion and an inner surface 100*s* of the frame facing in a vertical direction may have the same curved shape, or a lower surface 540*s* of the diaphragm and an upper surface 241*s* of the inner top plate facing in a vertical direction may have the same planar shape.

Therefore, when sagging of the diaphragm 540 occurs under high water pressure, the edge dome portion 520 and the frame 100 may be supported due to the same shape, and the diaphragm 540 and the inner top plate 241 may be supported due to the same shape, thereby preventing the diaphragm 540 from being deformed by high water pressure.

Figure 7:
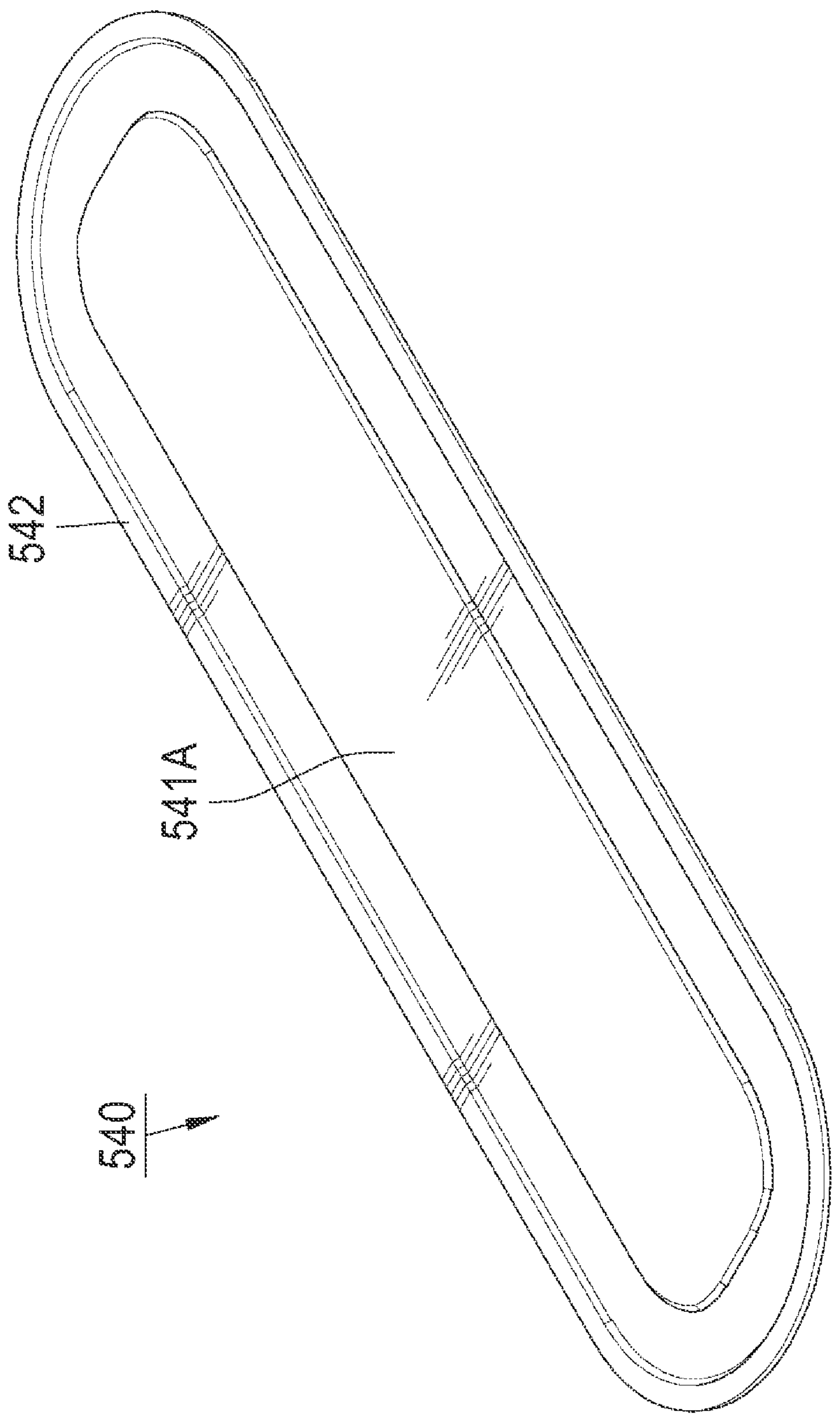
FIGS. 7 to 9 are perspective views illustrating a strength reinforcing structure of a diaphragm according to various embodiments.
Figure 8:
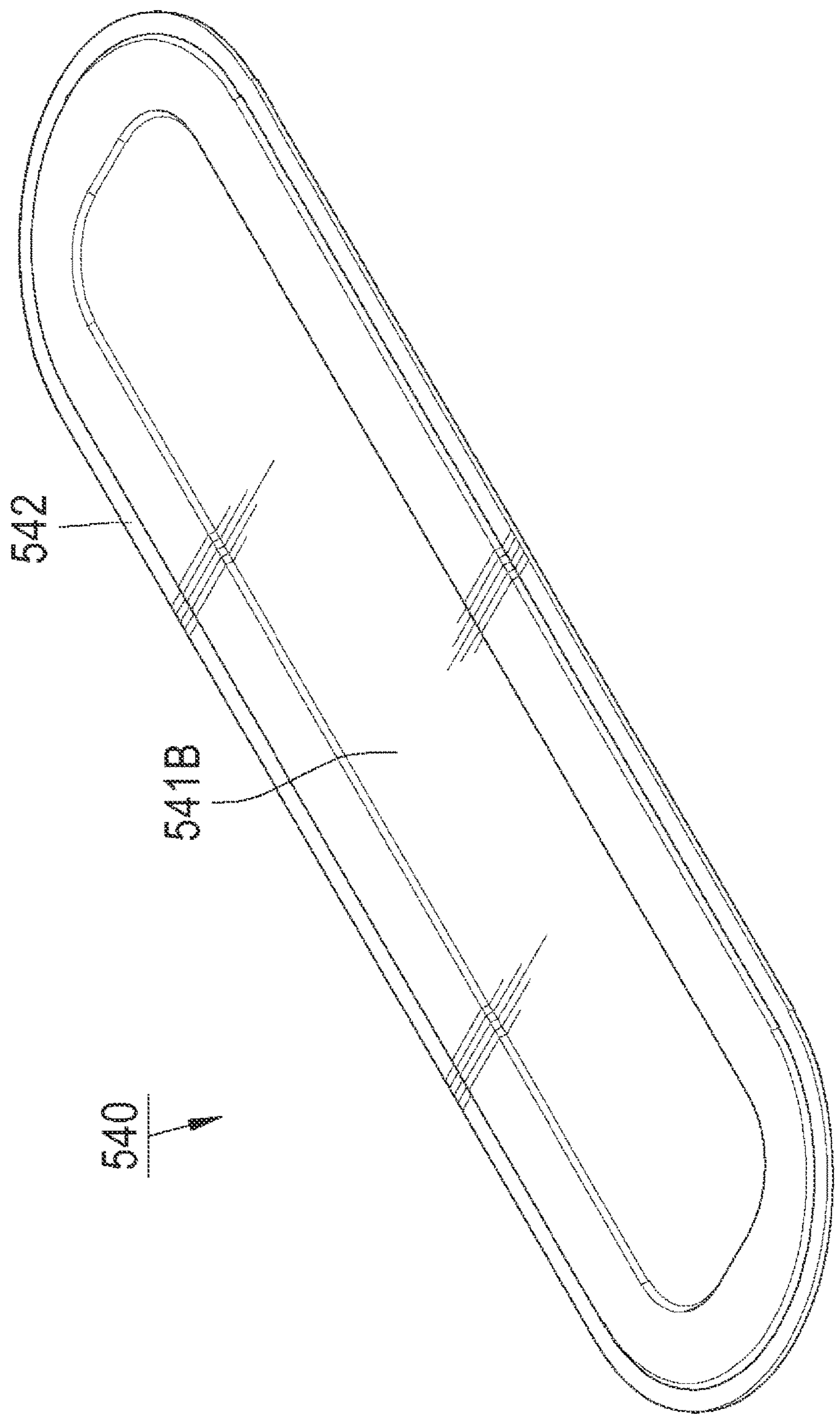
Figure 9:
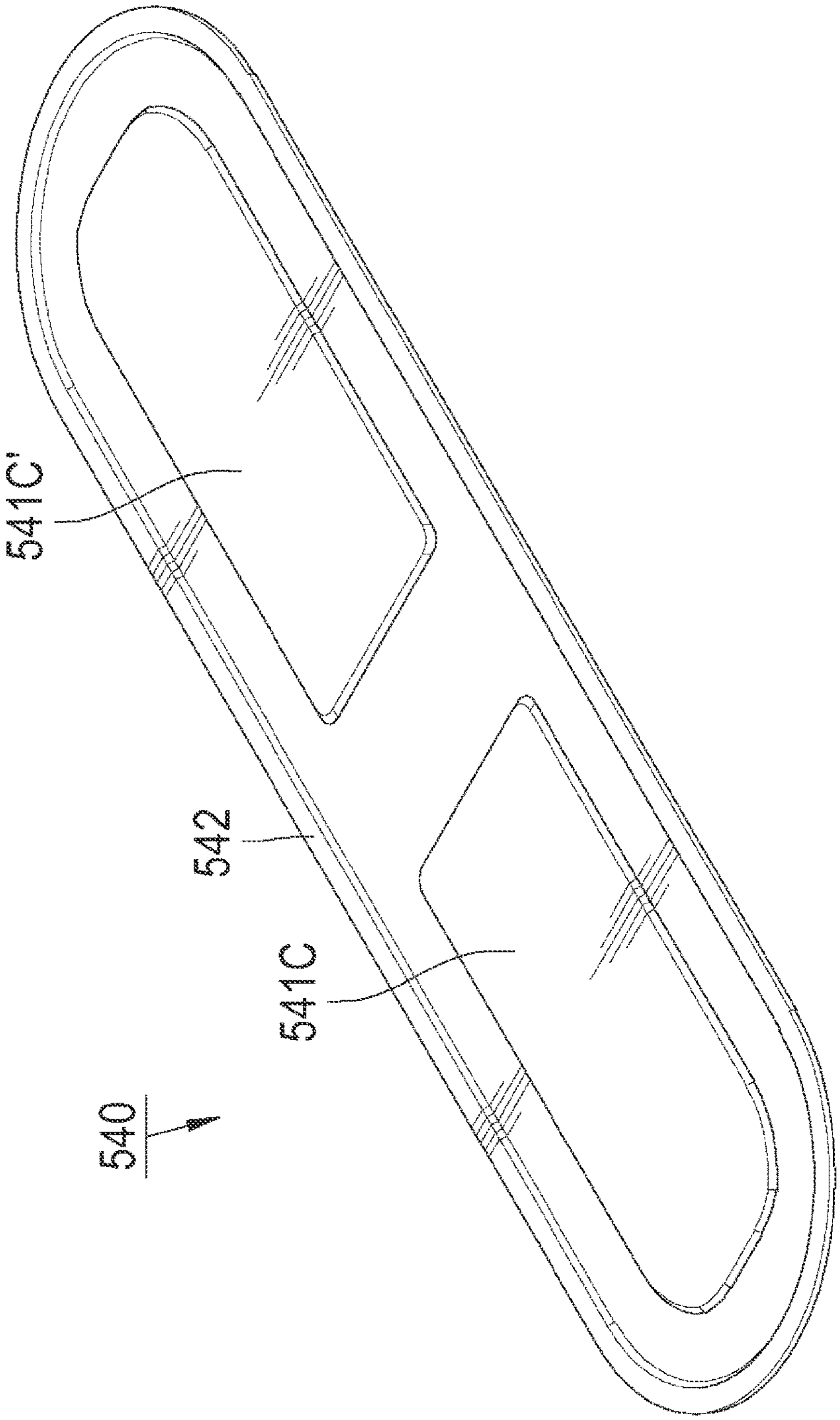

FIGS. 7 to 9 are perspective views illustrating a strength reinforcing structure of a diaphragm according to various embodiments.

According to the diaphragm 540 shown in FIG. 7, a center portion 541A may be provided in a planar shape protruding to be stepped relatively upwardly over the entire center portion of the diaphragm 540, that is, in the form of a planar protrusion.

According to the diaphragm 540 shown in FIG. 8, a center portion 541B may be formed in a planar shape protruding to be stepped relatively downwardly over the entire central portion of the diaphragm 540, that is, in the form of a planar depression.

According to the diaphragm 540 shown in FIG. 9, a pair of center portions 541C and 541C' may be provided on both sides of the central portion of the diaphragm 540 in a shape protruding to be stepped relatively upwardly.

Since the whole or part of the center portion of the diaphragm configured as described above protrudes to be stepped upwardly or downwardly, strength may be reinforced to increase rigidity and deformation may be reduced even under high water pressure, compared to a diaphragm formed to be entirely flat.

Figure 12:
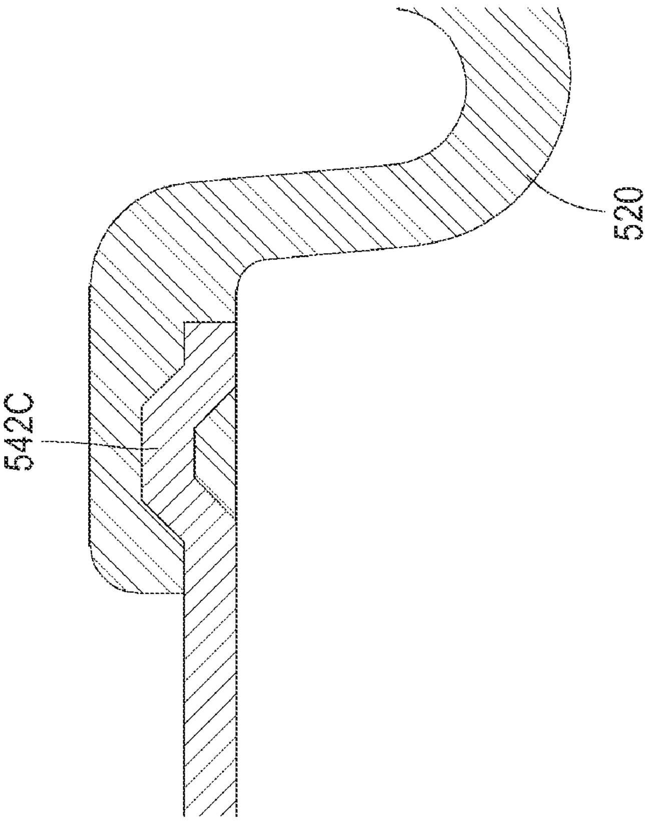
Figure 13:
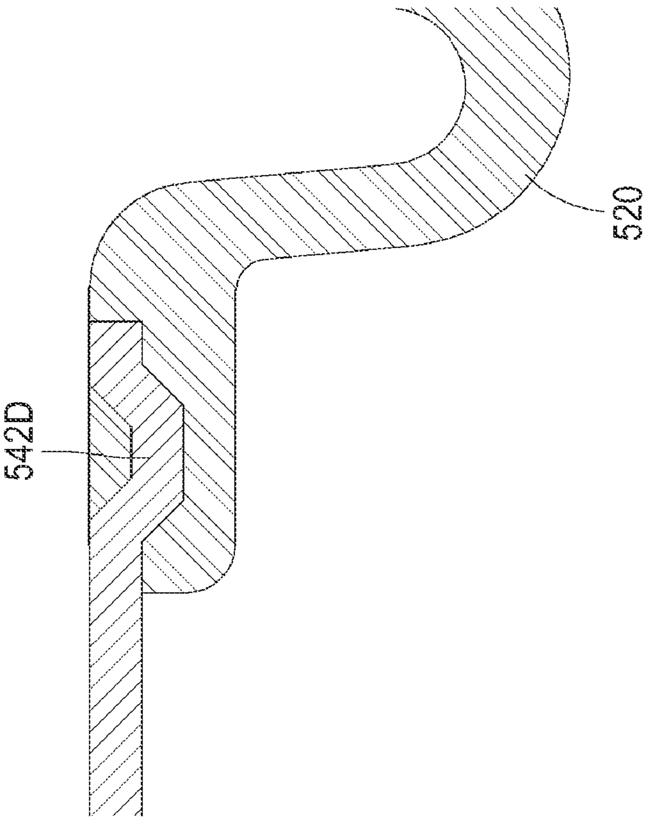
Figure 14:
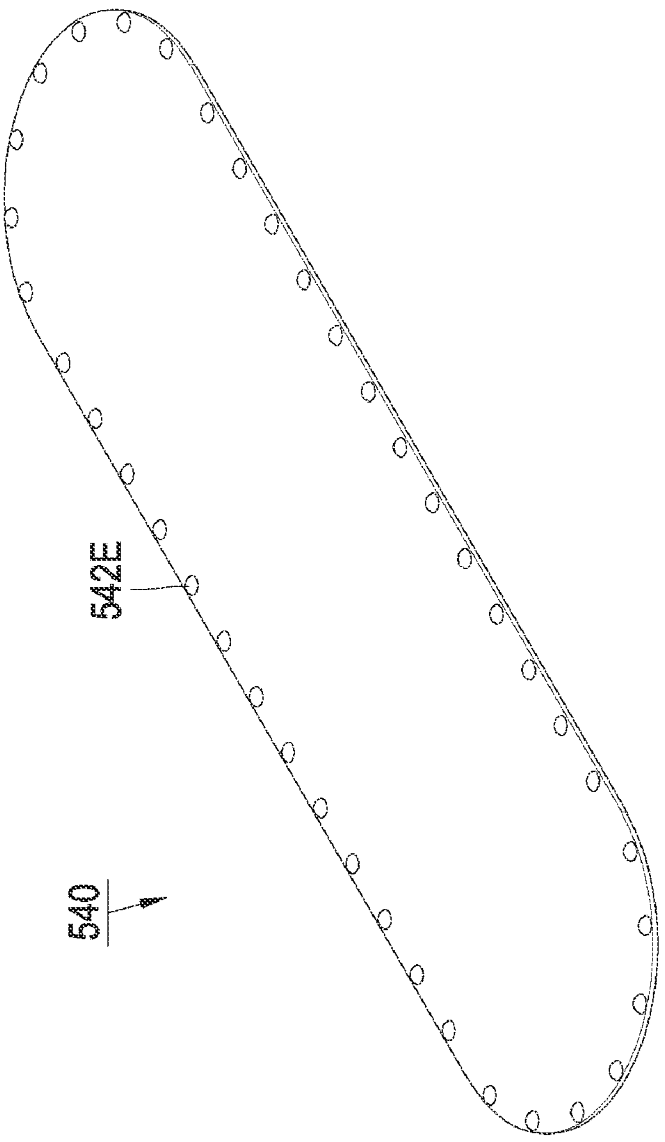
FIG. 14 is a perspective view illustrating a waterproof structure of a diaphragm according to another embodiment.

FIGS. 10 to 13 are side cross-sectional views illustrating a waterproof structure of a diaphragm inserted into an edge dome portion according to various embodiments, and FIG. 14 is a perspective view illustrating a waterproof structure of a diaphragm according to another embodiment.

Figure 10:
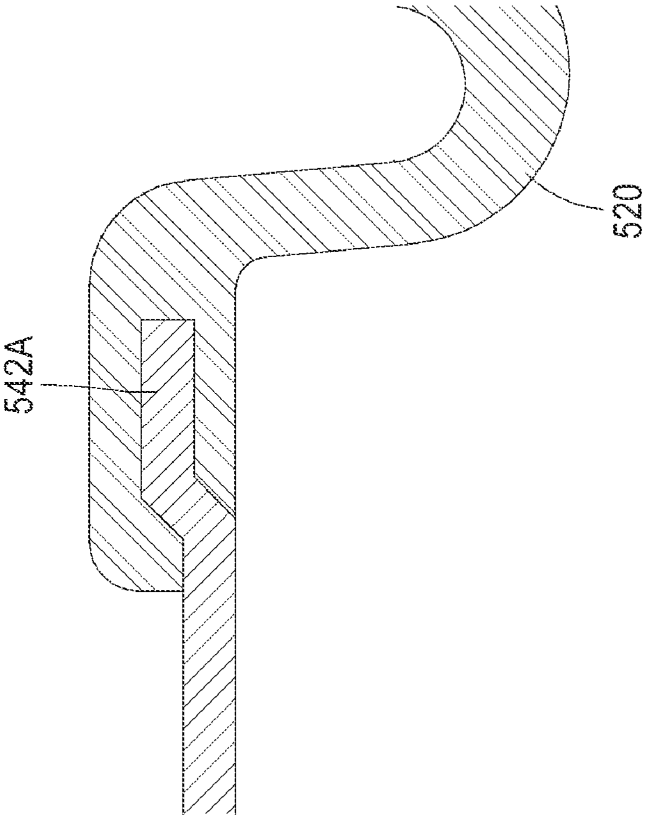
FIGS. 10 to 13 are side cross-sectional views illustrating a waterproof structure of a diaphragm inserted into an edge dome portion according to various embodiments of the present disclosure.

As shown in FIG. 10, an edge portion 542A of the diaphragm inserted into the edge dome portion 520 may be provided in the whole or part of the circumference of the diaphragm in the form of a planar portion stepped upwardly. Accordingly, the edge portion 542A in the form of a stepped protruding planar portion may be inserted into an inner circumferential surface of the edge dome portion 520.

Figure 11:
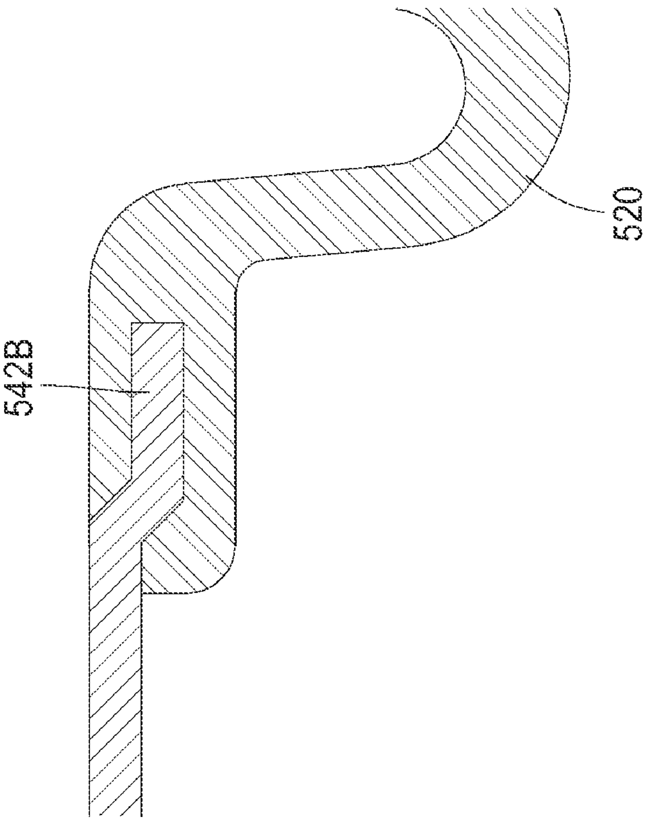

As shown in FIG. 11, an edge portion 542B of the diaphragm inserted into the edge dome portion 520 may be provided in the whole or part of the circumference of the diaphragm in the form of a planar portion stepped downwardly. Accordingly, the edge portion 542B in the form of a stepped recessed planar portion may be inserted into the inner circumferential surface of the edge dome portion 520.

As shown in FIG. 12, an edge portion 542C of the diaphragm inserted into the edge dome portion 520 may be provided in the whole or part of the circumference of the diaphragm in the form of a pocket stepped upwardly. Accordingly, the edge portion 542C in the form of an upwardly protruding pocket may be inserted into the inner circumferential surface of the edge dome portion 520.

As shown in FIG. 13, an edge portion 542C of the diaphragm inserted into the edge dome portion 520 may be provided in the whole or part of the circumference of the diaphragm in the form of a pocket stepped downwardly. Accordingly, the edge portion 542C in the form of a downwardly protruding pocket may be inserted into the inner circumferential surface of the edge dome portion 520.

As shown in FIG. 14, the diaphragm 540 may include a plurality of protrusions 542E protruding upwardly or downwardly at regular intervals along the circumference thereof. Accordingly, a peripheral portion of the diaphragm 540 and the protrusions 542E may be inserted into the inner circumferential surface of the edge dome portion.

Since the whole or part of the edge portion of the diaphragm configured as described above protrudes to be stepped upwardly or downwardly, a contact area and bonding force between the edge dome portion 520 and the diaphragm may increase and a waterproof function between the edge dome portion and the diaphragm under high water pressure may be further enhanced, compared to the diaphragm formed to be entirely flat.

The above description is merely illustrative of the technical idea of the present disclosure, and various modifications, changes, and substitutions may be made by those skilled in the art without departing from the essential characteristics of the present disclosure.

Accordingly, the embodiments disclosed in the present disclosure and the accompanying drawings are not intended to limit the technical idea of the present disclosure but to describe the present disclosure, and the scope of the technical idea of the present disclosure is not limited by the embodiments and the accompanying drawings.

The protection scope of the present disclosure should be interpreted by the following claims, and all technical ideas within the equivalent scope should be interpreted as being included in the scope of the present disclosure.

What is claimed is:

1. A waterproof microspeaker, comprising:
- a frame;
- a magnetic circuit provided below the frame and including a yoke, an inner magnet, an outer magnet, and a top plate;
- a voice coil located between the inner magnet and the outer magnet and configured to vibrate by a magnetic field of the magnetic circuit and mutual electromagnetic force when an electric signal is applied; and
- a diaphragm housing provided above the frame,
- wherein the diaphragm housing includes:
- a sidewall portion provided above the frame and having a predetermined height;
- an edge dome portion protruding upwardly or downwardly along an inner circumference of the sidewall portion; and
- a diaphragm provided inside the edge dome, allowing an upper end of the voice coil to be fixed thereto, and configured to generate sound by vibration of the voice coil,
- wherein the diaphragm includes a polymeric material including metal or plastic.

2. The waterproof microspeaker of claim 1, wherein the sidewall portion is formed of plastic material.

3. The waterproof microspeaker of claim 1, wherein the diaphragm housing further includes a waterproof ring portion connected to the edge dome portion and protruding from an upper end of the sidewall portion.

4. The waterproof microspeaker of claim 3, wherein the edge dome portion and the waterproof ring portion are integrally formed of silicon rubber.

5. The waterproof microspeaker of claim 1, wherein the voice coil has a copper content of 15 to 100%.

6. The waterproof microspeaker of claim 1, wherein the frame and the edge dome portion are configured such that portions of surfaces thereof facing in a vertical direction have the same shape.

7. The waterproof microspeaker of claim 1, wherein the top plate and the diaphragm are configured such that portions of surfaces facing in a vertical direction have the same shape.

8. The waterproof microspeaker of claim 1, wherein the diaphragm includes:

an edge portion inserted into the edge dome portion; and a center portion protruding to be stepped upwardly or downwardly inside the edge portion.

9. The waterproof microspeaker of claim 8, wherein the edge portion has an upwardly or downwardly concavo-convex shape in the whole or part of the portion inserted into the edge dome portion.

10. The waterproof microspeaker of claim 8, wherein the edge portion has an upwardly or downwardly pocket-like shape in the whole or part of the portion inserted into the edge dome portion.

11. The waterproof microspeaker of claim 8, wherein the edge portion has an upwardly or downwardly protruding shape in the whole or part of the portion inserted into the edge dome portion.

* * * * *